(12) United States Patent
Mizutani

(10) Patent No.: US 6,827,620 B1
(45) Date of Patent: Dec. 7, 2004

(54) METHOD OF MANUFACTURING SPARK PLUG WITH NOBLE METAL CHIP FOR INTERNAL COMBUSTION ENGINE

(75) Inventor: Akihiko Mizutani, Kuwana (JP)

(73) Assignee: Denso Corporation (JP)

( * ) Notice: Subject to any disclaimer, the term of this patent is extended or adjusted under 35 U.S.C. 154(b) by 499 days.

(21) Appl. No.: 09/694,345

(22) Filed: Oct. 24, 2000

(30) Foreign Application Priority Data

Oct. 28, 1999 (JP) .......................................... 11-307490

(51) Int. Cl.⁷ .......................................... H01T 21/02
(52) U.S. Cl. .......................................... 445/7
(58) Field of Search .............................. 445/7, 35, 46, 445/49; 313/140–141, 118, 142

(56) References Cited

FOREIGN PATENT DOCUMENTS

JP         06-045049        2/1994

*Primary Examiner*—Kenneth J. Ramsey
*Assistant Examiner*—Joseph Williams
(74) *Attorney, Agent, or Firm*—Nixon & Vanderhye PC

(57) ABSTRACT

In a method of manufacturing a spark plug in which a noble metal chip provisionally fixed to a center or ground electrode by resistance welding and finally bonded to the center or ground electrode by laser welding, a current supply time period of the resistance welding is controlled according to a transit moving amount of an upper or lower electrode of a resistance welding equipment, which corresponds to a transit embedding length of the noble metal chip to the center or ground electrode, to establish a predetermined final embedding amount of the noble metal chip to the center or ground electrode.

10 Claims, 3 Drawing Sheets

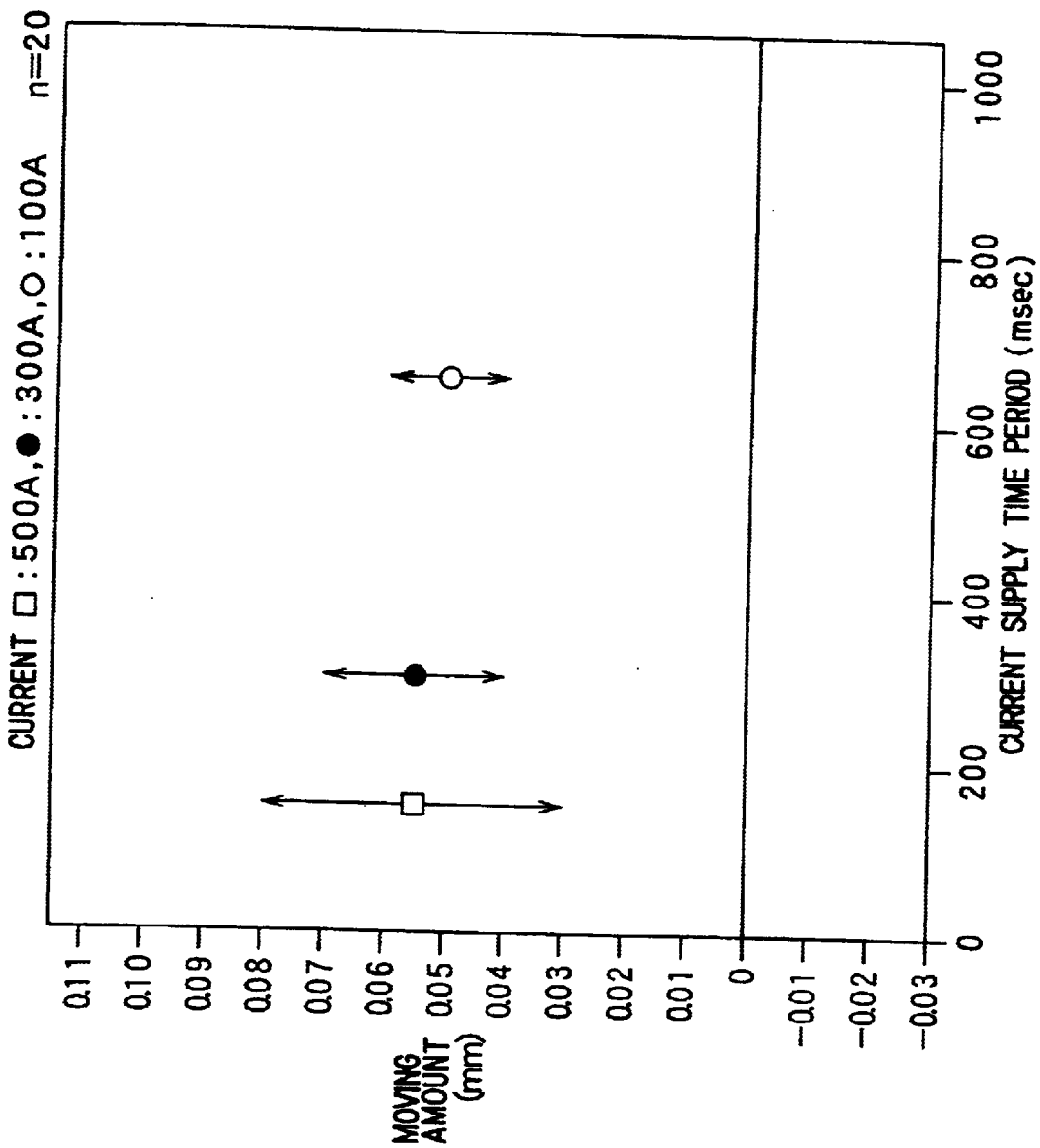

METHOD OF MANUFACTURING SPARK PLUG WITH NOBLE METAL CHIP FOR INTERNAL COMBUSTION ENGINE

CROSS REFERENCE TO RELATED APPLICATIONS

This application is based upon and claims the benefit of priority of Japanese Patent Application No. H.11-307490 filed on Oct. 28, 1999, the content of which is incorporated herein by reference.

BACKGROUND OF THE INVENTION

1. Field of the Invention

The present invention relates to a method of manufacturing a spark plug for internal combustion engine, in particular, a method of bonding a noble metal chip to a center or ground electrode by welding.

2. Description of Related Art

It is well known to bond a noble metal chip to a center or ground electrode only by laser welding, as shown in JP-A-6-45050. However, in a case of bonding only by laser welding, the noble metal chip has to be held by a holding jig or tool when the chip is bonded by laser welding. Accordingly, a construction of a laser welding equipment becomes complicated.

Further, as disclosed in JP-No.2921525, it is known to fix provisionally at first the noble metal chip to the center or ground electrode by resistance welding and to bond finally the same by laser welding.

However, when the noble metal chips are bonded to the respective center or ground electrodes provisionally by a conventional resistance welding method, in which a current amount to be supplied and a time period for current supply are controlled at preset values, and finally by a conventional laser welding method, bonding strength of the noble metal chips to the respective center or ground electrodes is likely to fluctuate.

As a result of an extensive research and experimental test, it is contemplated that this bonding strength fluctuation is caused by a fact that structure of molten portions to be formed by laser welding is uneven. Further, the uneven molten portion structure is affected by fluctuation of respective lengths of the noble metal chips to be embedded into the center or ground electrodes when the provisional resistance welding is conducted.

The experimental test result further reveals that, when the resistance welding on the noble metal chips is implemented under conditions that the current amount to be supplied and the time period for current supply are constant, the embedding length of the noble metal chips into the center or ground electrodes fluctuates because of, for example, uneven surface roughness of cutting surfaces of the noble metal chips or uneven surface roughness of surfaces of the center or ground electrodes, on which the noble metal chips are placed, respectively.

When the noble metal chip, for example, including Ir as a main composition and having a high melting point, is fixed by resistance welding, surface roughness of the surface on which the noble metal chip and the center or ground electrode are in contact with each other largely affects heat energy to be generated on a boundary surface between the noble metal chip and the center or ground electrode. Therefore, the resistance welding at the constant current amount and the constant time period is not sufficient enough to secure a stable and accurate embedding length of the noble metal chip into the center or ground electrode.

SUMMARY OF THE INVENTION

The present invention has been made in view of the above mentioned problem, and an object of the present invention is to provide a method of manufacturing spark plug in which a welding condition of provisional resistance welding is controlled or adjusted to secure a uniform predetermined final embedding amount of the noble metal chip before the final laser welding is implemented. As a result, stable and accurate bonding strength of the noble metal chip to a center or ground electrode can be assured, since the construction of molten portion formed by laser welding is uniform and stable.

To achieve the above object, the steps are comprised of, at first, putting a noble metal chip on a leading end of one of the center and ground electrodes so that a surface of the noble metal chip may come in contact with a surface of the leading end of the one of the center and ground electrodes, next, executing resistance welding provisionally in such a manner that current is passed through the noble metal chip and the leading end of the one of the center and ground electrodes, while the noble metal chip is pressed toward the leading end of the one of the center and ground electrodes, so as to fix the noble metal chip to the one of the center and ground electrodes in a state that a part of the noble metal chip is embedded into the one of the center and ground electrodes, and, then, executing laser welding finally so as to melt a circumference of a portion where the noble metal chip is embedded into the one of the center and ground electrodes.

When the provisional welding is executed, at least one of a current supply amount and a current supply time period is controlled according to at least one of a transit embedding length and a transit embedding speed of the noble metal chip to the one of the center and ground electrodes to establish a predetermined final embedding amount of the noble metal chip to the one of the center and ground electrodes.

It is preferable that first and second electrodes (upper and lower electrodes) of a resistance welding equipment are set to be electrically conductive with the noble metal chip and the one of the center and ground electrodes, while the first electrode presses the noble metal chip toward the one of the center and ground electrodes. The current supplied between the first and second electrodes by a power source of the resistance welding is controlled by a transit moving length or a transit moving speed of at one of the first and second electrodes, which corresponds to the transit embedding length or the transit embedding speed of the noble metal chip to the one of the center and ground electrodes.

Furthermore, the predetermined final embedding amount of the noble metal chip is, preferably, not larger than 0.1 mm to obtain an adequate alloy ratio of the noble metal chip to the one of the center and ground electrodes.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 3 is a chart showing fluctuation of embedding lengths of noble metal chips into center or ground electrodes.

DETAILED DESCRIPTION OF THE PREFERRED EMBODIMENTS

Figure 1:
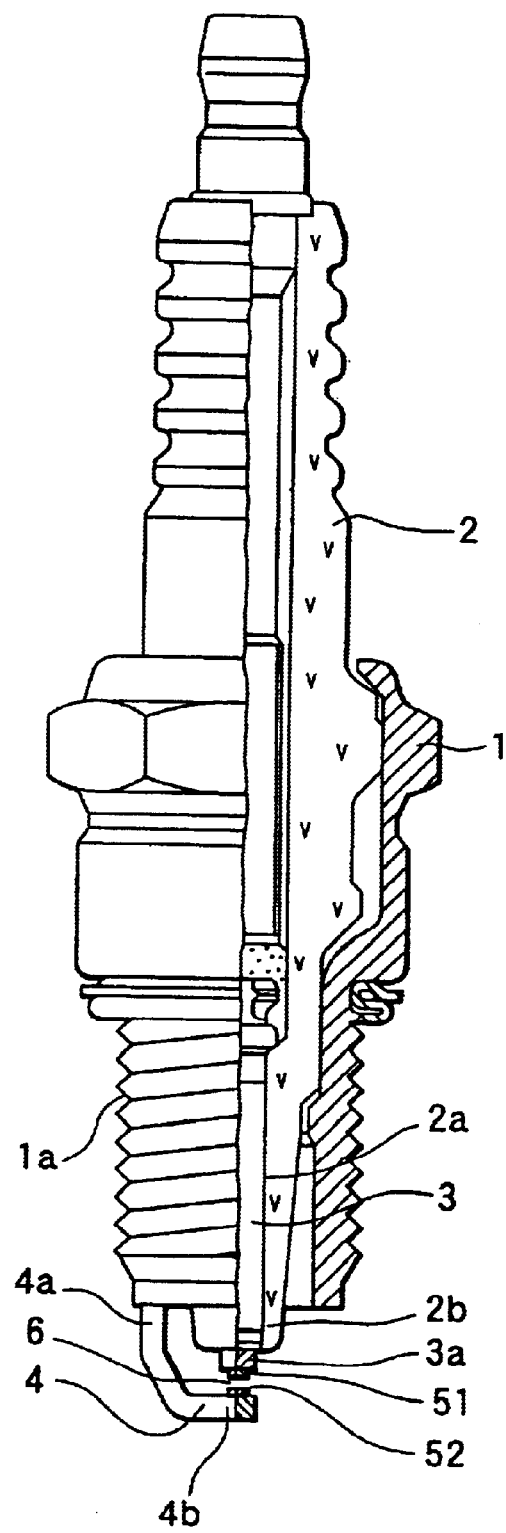
FIG. 1 is a semi cross sectional view of a spark plug according to an embodiment of the present invention.

FIG. 1 shows a semi-cross sectional view of a spark plug for an internal combustion engine according to a preferred embodiment of the present invention.

The spark plug 1 has a tubular housing 1 having a thread 1a for mounting to an engine cylinder block (not shown). An insulator 2 made of alumina ceramics ($Al_2O_3$) is fitted into the housing 1 and an end portion 2b of the insulator 2 is exposed out of the housing 1.

A center electrode 3 is inserted into and fixed to a through hole 2a of the insulator 2. The center electrode 3 is composed of a column shaped main body whose inner member is made of metal material having good thermal conductivity such as copper and whose outer member is made of metal material having good heat resistance and corrosion endurance such as Ni base alloy. The insulator 2 surrounds a circumference of the center electrode 3 so as to expose a leading end portion 3a of the center electrode 3 out of the end portion 2b of the insulator 2, as shown in FIG. 1.

A ground electrode 4 is composed of a pillar shaped body whose one end 4a is fixed to the end of the housing 1 by welding and which is formed in a letter L shape as a whole. An end portion 4b opposite to the end 4a of the ground electrode 4 faces the leading end portion 3a of the center electrode 3 to constitute a spark discharge gap 6 therebetween. The ground electrode 4 is made of metal material having good heat resistance and corrosion endurance such as Ni base alloy.

In view of reducing spark consumption of spark discharge portions of the electrodes 3 and 4, noble metal chips 51 and 52 are bonded and fixed to the leading end portion 3a of the center electrode 3 and the leading end portion 4b of the ground electrode 4, respectively, finally by laser welding. Each of the noble metal chips 51 and 52 is, for example, a pillar shaped element made of pure Ir or Ir alloy containing at least one of material selected from Rh, Ru, Pt and $Y_2O_3$. The spark discharge gap 6, for example, 1 mm, is constituted by a distance between the noble metal chips 51 and 52.

Next, a manufacturing process of the spark plug according to the present embodiment mainly with respect to a method of bonding the noble metal chip to the center or ground electrode 3 or 4 is described hereinafter and the explanation with respect to methods of manufacturing the other parts is omitted as they are well known. The method according to the embodiment of the present invention is a method of provisionally fixing at first the noble metal chip 51 or 52 to the center or ground electrode 3 or 4 by resistance welding and, then, finally bonding the same by laser welding. A resistance welding equipment and a laser welding equipment, which are widely prevailing, may be used.

Figure 2:
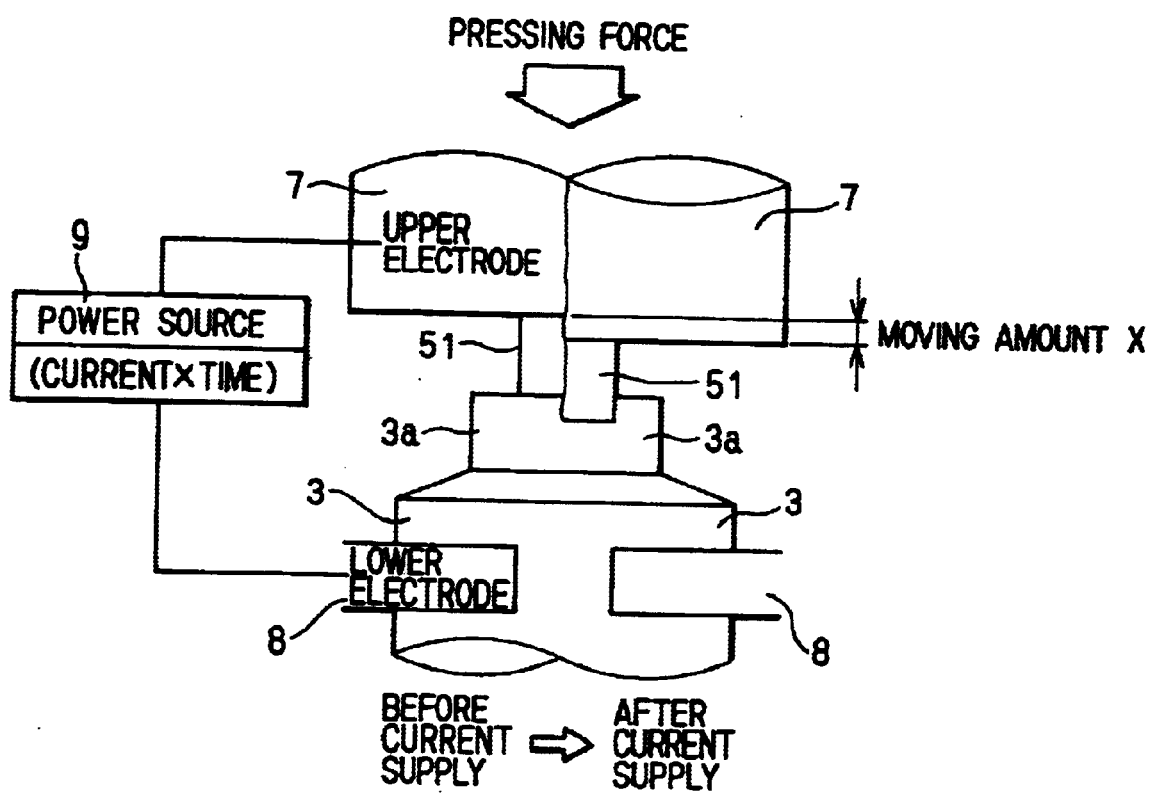
FIG. 2 is a schematic view showing a resistance welding method for manufacturing the spark plug according to the embodiment.

FIG. 2 shows schematically a method of fixing provisionally the chip 51 to the center electrode 3 by resistance welding. A method of fixing provisionally the chip 52 to the ground electrode 4, the explanation of which is omitted, is similar to the method shown in FIG. 2. A view on a left side of a dot-dash line of FIG. 2 shows a state before current is supplied for resistance welding and a view on a right side thereof shows a state after current has been supplied.

As shown in FIG. 2, the resistance welding equipment is provided with an upper electrode 7 (first electrode), a lower electrode 8 (second electrode) and a power source 9 for generating resistance heat between the upper and lower electrodes 7 and 8. The upper and lower electrodes 7 and 8 may press the work intervening between both the electrodes 7 and 8 (the noble metal chip 51 and the center electrode 3) in a facing direction of the electrodes 7 and 8 (up and down direction in FIG. 2).

A first step for provisionally fixing the noble metal chip 51 to the center electrode 3, the noble metal chip 51 is put on the center electrode 3 so as to come in contact with a welding surface of the leading end portion 3a of the center electrode 3, while making the center electrode 3 electrically conductive with the lower electrode 8 and making the noble metal chip 51 electrically conductive with the upper electrode 7. Then, the power source 9 supplies current between the upper and lower electrodes 7 and 8, while the chip 51 is pressed toward the leading end portion 3a of the center electrode 3 with a pressing force (for example, 250 N). An amount of current is controlled (for example, within several hundreds A) or a current supply time period is controlled (for example, within several hundreds m sec). As a result, the noble metal chip 51 is provisionally fixed to the leading end portion 3a of the center electrode 3.

As the chip 51 is pressed toward the leading end portion 3a of the center electrode 3, a part of the chip 51 is embedded into the leading end portion 3a. According to the embodiment of the present invention, a transit moving amount or moving speed of the upper electrode 7 (or a moving amount or moving speed of the lower electrode 8), which corresponds to a transit embedding length or embedding speed of the chip 51 to the center electrode 3, is measured, for example, by a displacement meter provided in the upper electrode 7 before the upper electrode 7 establishes a final moving amount X shown in FIG. 2 and, according to the measurement result, the time period or the amount of current to be supplied between the electrodes 7 and 8 by the power source is adjusted in order for the upper electrode 7 to accurately establish the moving amount X so that the embedding length of the chip 51 to the center electrode 3 may be stably controlled.

The adjustment of the time period of a predetermined current to be supplied may be also conducted in such a manner that the predetermined current supply continues until the fact that the upper electrode 7 has established the moving amount X is noticed visually or in use of a television camera.

FIG. 3 shows a result of experimental test, which shows fluctuation of the embedding length of the noble metal chip to the center or ground electrode. The test was conducted on a pillar shaped noble metal chip 51 whose length is 0.85 mm and whose diameter is 0.7 mm by supplying different current amount, 500 A (□ plot), 300 A (● plot) or 100 A (○ plot) with 250 N constant pressing force. With respect to each of the current amount to be supplied, a relationship between the moving amount X (mm) of the upper electrode 7, which corresponds to the embedding length of the noble metal chip, and the current time period (m second) is illustrated in FIG. 3. A sample number n of each plot is 20 and a fluctuation amount of each plot (a range shown by opposite arrows in FIG. 3) is 4 σ.

As shown in FIG. 3, when the welding condition is always constant, that is, when the current supply amount and the current supply time period are not controlled according to the transit embedding amount or speed, the fluctuation of the final embedding amount of the noble metal chip to the center or ground electrode is very large in each plot as shown in the apposite arrows in FIG. 3. This large fluctuation of the embedding amount causes a structure fluctuation of molten portions formed finally by laser welding.

However, when the current supply amount or the current supply time period of the power source 9 is feedback controlled by watching the embedding amount of the noble metal chip to the center or ground electrode, moving amount of the upper or lower electrode 7 or 8 in an acting direction of pressing force, during a course of resistance welding operation, as mentioned above, the final embedding amount becomes constant and the fluctuation thereof is limited.

After the provisional resistance welding as mentioned above, the laser welding (for example, 8 points welding) is conducted around a circumference of the embedded portion of the noble metal chip 51 to the center electrode 3 to melt respective parts of the noble metal chip 51 and the center electrode 3.

This welding method is also applicable to the noble metal chip 52 and the ground electrode 4. As a first step of conducting provisional resistance welding, the noble metal chip 52 is put on the ground electrode 4 so as to come in contact with a welding surface of the leading end portion 4b of the ground electrode 4, while making the center electrode 3 electrically conductive with the lower electrode 8 and making the noble metal chip 52 electrically conductive with the upper electrode 7. Then, the feedback control of current from the power source 9 is executed similarly as the case of welding the chip 51 to the center electrode 3 to complete the resistance welding. Finally, the laser welding is conducted to bond the chip 52 to the ground electrode 4.

In summary, in the manufacturing method according to the embodiment of the present invention, the current supply amount or the current supply time period of the provisional resistance welding is controlled by the transit moving amount or moving speed of the upper or lower electrode 7 or 8 in a pressing force direction thereof, which corresponds to the transit embedding length or embedding speed of the noble metal chip 51 or 52 to the center or ground electrode 3 or 4. Accordingly, an accurate and stable embedding length of the noble metal chip 51 or 52 to the center or ground electrode 51 or 52 may be secured So that the structure of the molten portion formed by the final laser welding may become uniform and stable.

Further, as a result of investigation, it is concluded that the embedding length of the noble metal chip 51 or 52 to the center or ground electrode 51 or 52 is preferably not larger than 0.1 mm to secure a sufficient bonding strength of the molten portion composed of alloy formed by the laser welding.

Though the center and ground electrodes 3 and 4 are provided with the noble metal chips 51 and 52, respectively, according to the embodiment mentioned above, at least one of the electrodes 3 and 4 may be provided with one of the noble metal chips 51 and 52. Further, the bonding method according to the present invention may be applied to at least one of the center and ground electrodes 3 and 4 that are provided with the noble metal chips 51 and 52, respectively.

What is claimed is:

1. A method of manufacturing a spark plug for internal combustion engine having a center electrode, a housing surrounding and holding the center electrode so as to expose a leading end of the center electrode out of an end of the housing and a ground electrode whose one leading end is fixed to the end of the housing and whose another leading end faces the leading end of the center electrode to constitute a spark discharge gap therebetween, and a noble metal chip bonded to the leading end of at least one of the center and ground electrodes, comprising steps of:

putting the noble metal chip on the leading end of the one of the center and ground electrodes so that a surface of the noble metal chip may come in contact with a surface of the leading end of the one of the center and ground electrodes;

executing resistance welding provisionally in such a manner that current is passed through the noble metal chip and the leading end of the one of the center and ground electrodes, while the noble metal chip is pressed toward the leading end of the one of the center and ground electrodes, so as to fix the noble metal chip to the one of the center and ground electrodes in a state that a part of the noble metal chip is embedded into the one of the center and ground electrodes; and executing laser welding finally so as to melt a circumference of a portion where the noble metal chip is embedded into the one of the center and ground electrodes, wherein at least one of a current supply amount and a current supply time period by the provisional resistance welding is controlled to change according to at least one of a transit embedding length and a transit embedding speed of the noble metal chip to the one of the center and ground electrodes to establish a predetermined final embedding amount of the noble metal chip to the one of the center and ground electrodes.

2. A method of manufacturing a spark plug according to claim 1, wherein a resistance welding equipment to be used in resistance welding has a first electrode electrically conductive to the noble metal chip and a second electrode electrically conductive to the one of the center and ground electrodes and, while the first electrode presses the noble metal chip toward the one of the center and the ground electrodes, the current supplied between the first and second electrodes passes through the noble metal chip and the leading end of the one of the center and ground electrodes and, further, wherein the one of the transit embedding length and the transit embedding speed of the noble metal chip to the one of the center and ground electrodes is measured by at least one of a transit moving length and a transit moving speed of at least one of the first and second electrodes.

3. A method of manufacturing a spark plug according to claim 1, wherein the predetermined final embedding amount of the noble metal chip to the one of the center and ground electrodes is not larger than 0.1 mm.

4. A method of manufacturing a spark plug according to claim 1, wherein the noble metal chip is made of one of pure Ir and Ir alloy including at least one of Rh, Ru, Pt and $Y_2O_3$.

5. A method of manufacturing a spark plug for an internal combustion engine, the spark plug having a center electrode, a housing surrounding and holding the center electrode so as to expose a leading end of the center electrode out of an end of the housing, and a ground electrode having one end fixed to the end of the housing and having another, leading end facing the leading end of the center electrode to define a spark discharge gap therebetween, and a noble metal chip bonded to the leading end of at least one of the center and ground electrodes, comprising steps of:

placing the noble metal chip on the leading end of the one of the center and ground electrodes so that a surface of the noble metal chip contacts a surface of the leading end of the one of the center and ground electrodes;

provisionally fixing the noble metal chip to the one of the center and ground electrodes by passing current through the noble metal chip and the leading end of the one of the center and ground electrodes while pressing the noble metal chip toward the leading end of the one of the center and ground electrodes, so that a part of the noble metal chip is embedded into the one of the center and ground electrodes;

determining at least one of a transit embedding length and a transit embedding speed of the noble metal chip during said pressing;

feedback controlling at least one of a current supply amount and a current supply time period during said passing and pressing according to at least one of said determined transit embedding length and transit embedded speed of the noble metal chip to achieve a predetermined final embedding amount of the noble metal chip; and executing laser welding so as to melt a circumference of a portion where the noble metal chip is embedded into the one of the center and ground electrodes.

6. A method of manufacturing a spark plug according to claim 5, wherein said provisionally fixing includes providing a first electrode electrically conductive to the noble metal chip and a second electrode electrically conductive to the one of the center and ground electrodes.

7. A method of manufacturing a spark plug according to claim 6, wherein the first electrode presses noble metal chip toward the one of the center and the ground electrodes, the current supply between the first and second electrodes passing through the noble metal chip and the leading end of the one of the center and ground electrode.

8. A method of manufacturing a spark plug according to claim 7, wherein the one of the transit embedding length and transit embedding speed of the noble metal chip to the one of the center and ground electrodes is determined by measuring at least one of a transit moving length and a transit moving speed of the first electrode.

9. A method of manufacturing a spark plug according to claim 5, wherein the predetermined final embedding amount of the noble metal chip to the one of the center and ground electrodes is not larger than 0.1 mm.

10. A method of manufacturing a spark plug according to claim 5, wherein the noble metal chip is made of one of pure Ir and Ir alloy including at least one of Rh, Ru, Pt and $Y_2O_3$.

* * * * *